(12) United States Patent
Perlo et al.

(10) Patent No.: US 7,061,129 B2
(45) Date of Patent: Jun. 13, 2006

(54) ELECTRIC GENERATOR HAVING A MAGNETOHYDRODYNAMIC EFFECT

(75) Inventors: Pietro Perlo, Orbassano (IT); Anatolii Zvezdin, Orbassano (IT); Gianfranco Innocenti, Orbassano (IT); Mauro Brignone, Orbassano (IT); Piermario Repetto, Orbassano (IT); Mauro Sgroi, Orbassano (IT); Vito Lambertini, Orbassano (IT); Gianluca Bollito, Orbassano (IT); Nello Li Pira, Orbassano (IT); Marzia Paderi, Orbassano (IT); Rossella Monferino, Orbassano (IT); Daniele Pullini, Orbassano (IT); Marco Pizzi, Orbassano (IT)

(73) Assignee: C.R.F. Societa Consortile per Azioni, Orbassano (IL)

( * ) Notice: Subject to any disclaimer, the term of this patent is extended or adjusted under 35 U.S.C. 154(b) by 0 days.

(21) Appl. No.: 11/014,839

(22) Filed: Dec. 20, 2004

(65) Prior Publication Data

US 2005/0167987 A1    Aug. 4, 2005

(30) Foreign Application Priority Data

Dec. 18, 2003  (IT) .......................... TO2003A1022

(51) Int. Cl.
*H02K 44/00* (2006.01)
(52) U.S. Cl. ........................................ 290/1 R; 310/11
(58) Field of Classification Search ................ 290/1 R
See application file for complete search history.

(56) References Cited

U.S. PATENT DOCUMENTS 3,294,989 A    12/1966 Eichenberger
3,395,967 A  *  8/1968 Karr ................................ 431/1
3,428,836 A  *  2/1969 Georges ........................ 310/11
3,432,694 A    3/1969 Bidard
3,443,129 A  *  5/1969 Hammitt ....................... 310/11
3,555,312 A  *  1/1971 Bidard ......................... 310/11
4,571,534 A    2/1986 Cover
4,851,722 A  *  7/1989 Zauderer ..................... 310/11
6,225,705 B1 *  5/2001 Nakamats ..................... 290/43
6,375,454 B1 *  4/2002 Jacobsen et al. ............... 431/1

FOREIGN PATENT DOCUMENTS

DE       32 18 303 A1    11/1983
EP          282681 A1  *  9/1988
FR       1 448 059 A       8/1966
JP         04087552 A  *  3/1992
WO    WO 8502226 A1  *  5/1985

OTHER PUBLICATIONS

P. Satyamurthy, et al.: "A Conceptual Scheme for Electrical Power Generation from Nuclear Water Heat Using Liquid Metal Magetohydrodynamic Energy Converter", Energy conversion and Managementk, Elsevier Science Publishers, Oxford, GB, vol.. 36, No. 10, Oct. 1, 1995, pp. 975-987, XP004039872, ISSN: 0196-8904.

* cited by examiner

*Primary Examiner*—Joseph Waks
(74) *Attorney, Agent, or Firm*—Sughrue Mion, PLLC

(57) ABSTRACT

The generator comprises at least one source of pressurized gas and a closed hydraulic circuit containing a solution comprising an electrically conducting vehicle liquid in which a charge of micro- or nanoparticles of a metal material is dispersed. The circuit has
- at least one inlet port connected to the source so that, when in operation, it receives a flow of pressurized gas capable of causing circulation of the solution within the circuit in a predetermined direction, forming a two-phase gas-liquid mixture with it,
- a restriction in cross section, downstream from the inlet port calibrated in such a way as to cause an increase in velocity and condensation of the two-phase mixture, and at least one outlet port, located downstream from the restriction through which the gas mixed with the solution can be released and discharged from the circuit.

The generator also comprises magnetic field generating devices, associated with a length of the hydraulic circuit lying between the inlet port and the restriction in cross section in order to generate an induction flux (10) at right angles to the direction of flow of the solution in that length of circuit, and at least one pair of electrodes placed in contact with the solution in that length of the hydraulic circuit, and facing each other in a direction essentially at right angles to the lines of force of the magnetic field and the flow direction of the solution in that length of circuit.

The arrangement is such that, when in operation, an electric current whose strength depends on the flow velocity of the solution in that length of the hydraulic circuit, the strength of the associated magnetic field and the electrical resistance between the electrodes flows between the electrodes.

12 Claims, 2 Drawing Sheets

ELECTRIC GENERATOR HAVING A MAGNETOHYDRODYNAMIC EFFECT

BACKGROUND OF THE INVENTION

This invention relates to an electric generator, and in particular an electric generator based on the magnetohydrodynamic effect.

SUMMARY OF THE INVENTION

The object of the invention in particular is to provide an electric generator of high efficiency and small dimensions.

These and other objects will be accomplished according to the invention through an electric generator comprising
at least one source of pressurized gas,
a closed hydraulic circuit, essentially in the shape of a ring, containing a colloidal solution comprising an electrically conducting vehicle liquid in which a charge of micro- or nanoparticles of a metal material is dispersed; the hydraulic circuit having
at least one inlet port connected to the said source so that, when in operation, it receives a flow of pressurized gas capable of causing circulation of the said solution within the circuit in a predetermined direction, forming a two-phase gas-liquid mixture with it,
a restriction in the flow cross section located downstream from the said inlet port and calibrated so as to cause an increase in velocity and condensation of the said two-phase-mixture, and
at least one outlet port located downstream from the restriction through which the gas mixed with: the said solution can be released and evacuated from the circuit;
the generator also comprising
magnetic field generating means associated with a length of the hydraulic circuit lying between the said inlet port and the restriction in cross section and capable of generating an induction flux substantially at right angles to the flow direction of the solution in that length of circuit, and
at least one pair of electrodes placed in contact with the solution in that length of the hydraulic circuit, facing each other in a direction essentially at right angles to the lines of force of the magnetic field produced by the said generator means and the flow direction of the solution in that length of circuit,
the arrangement being such that, when in operation, an electrical current whose intensity is a function of the rate of flow of the solution in the said length of the hydraulic circuit, the strength of the associated magnetic field and the electrical resistance between the aforesaid electrodes flows between the said electrodes.

Conveniently, the said at least one source of pressurized gas comprises a microcombustor device.

The vehicle liquid for the colloidal solution may for example be water or an alcohol, and the metal material dispersed in it may comprise micro- or nanoparticles of one or more noble metals, of one or more alkali metals, or again mercury or alloys of tin and zinc.

BRIEF DESCRIPTION OF THE DRAWING

Further features and advantages of the invention will appear from the detailed description which follows, provided purely by way of non-restricting example with reference to the appended drawings in which.

DETAILED DESCRIPTION OF THE INVENTION

Figure 1:
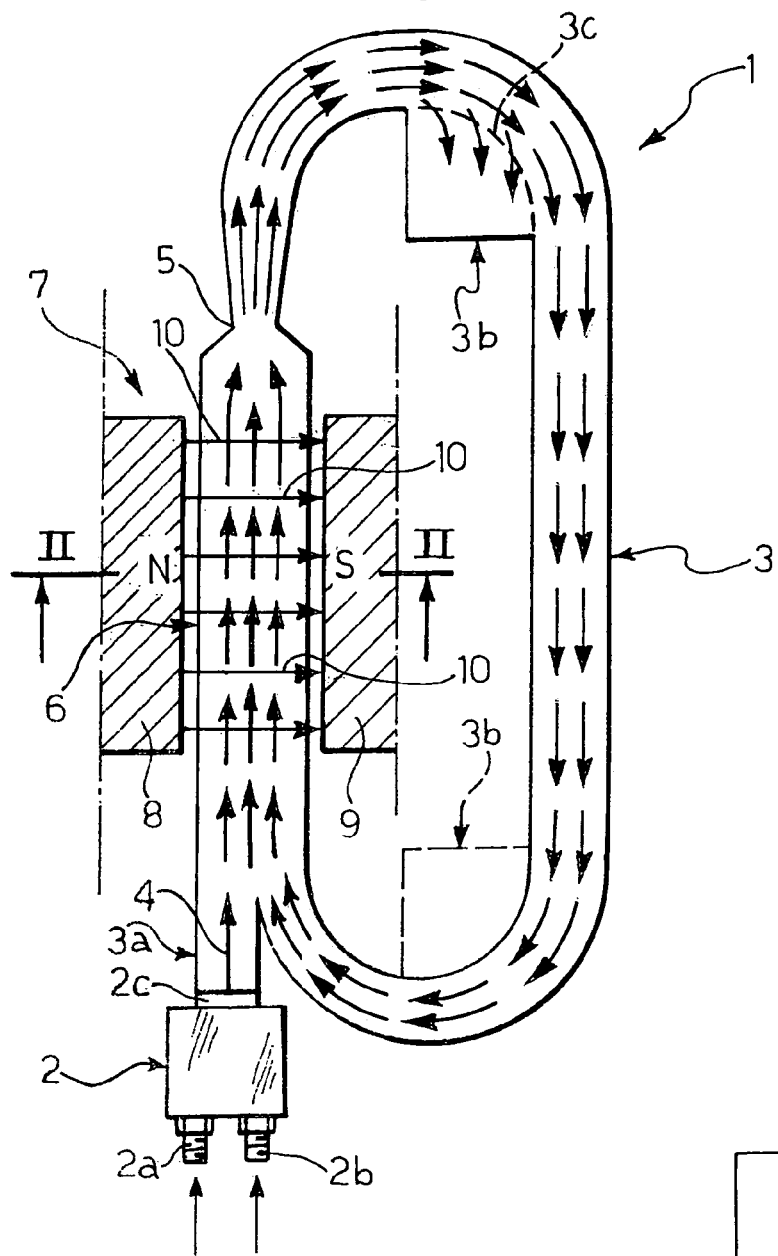
FIG. 1 is a diagrammatical illustration partly in cross section of a first magnetohydrodynamic-effect electric generator according to this invention.

In FIG. 1 an electric generator according to the invention is indicated as a whole by 1. This generator comprises a pressurized-gas source 2, comprising for example a microcombustor, with an inlet 2a for a fuel and an inlet 2b for a comburent or oxidizing agent. Outlet 2c for the exhaust gases for a microcombustor 2 is in the form of a nozzle and is connected to a port or inlet connection 3a to a hydraulic circuit indicated as a whole by 3. This comprises variable-density ceramic material with a greater density on the inside gradually reducing towards the outside and capable of rendering the structure adiabatic in order to minimize radiation losses. This circuit essentially comprises a conduit which is closed upon itself in the form of a ring filled with a colloidal solution which comprises an electrically conducting vehicle liquid such as water or an alcohol in which a charge of micro- or nanoparticles of a metal material, for example one or more noble metals, or one or more alkali metals, or again mercury, or alloys of tin and zinc are dispersed.

Inlet port 3a to hydraulic circuit 3 is constructed and orientated in such a way that, when in operation, it can allow a flow of gas, shown symbolically by an arrow indicated by 4, into the circuit in a direction substantially parallel to the local flow direction of the aforesaid solution.

The flow of high-pressure gas thus entering circuit 3 is capable of inducing circulation of the said solution in a predetermined direction forming a two-phase gas-liquid mixture with it. In the embodiment illustrated in the drawings, this solution circulates clockwise, as shown symbolically by a plurality of arrows.

A choke 5, that is a restriction in cross section transverse to the flow, calibrated so as to cause a predetermined increase in velocity and condensation of the aforesaid two-phase gas-liquid mixture, is provided in hydraulic circuit 3 downstream from inlet port 3a.

Purely indicatively, hydraulic circuit 3, shown in FIG. 1, may have dimensions of the order of 3×5 cm, a cross section with a diameter of the order of 0.5 cm, which reduces to approximately 0.1 cm at choke 5.

Choke 5 also brings about separation of the gas and liquid phases.

Downstream from choke 5, hydraulic circuit 3 has an outlet port, indicated as a whole by 3b, through which gases mixed with the circulating solution may be released and evacuated from the circuit. At this outlet port 3b, hydraulic circuit 3 has a portion of porous wall 3c which will selectively permit escape of the gases alone. The porosity is selected in such a way that the metallic liquid with a high surface tension cannot penetrate away from the combustion circuit. Conveniently, in order to reduce head losses, the portion of porous wall 3c is conveniently provided on the inside of inner circuit 3b. This also makes it possible to guarantee the continuity and direction of the solution's flow.

Outlet port 3b is preferably located in the position illustrated by a solid line in FIG. 1, but this may also be located elsewhere, between choke 5 and inlet port 3a, for example in the location shown by a dashed line.

The length of the circuit lying between inlet port 3a and choke 5, indicated by 6 in FIG. 1, is preferably straight. This length 6 of hydraulic circuit 3 is associated with a magnetic-field-generating arrangement 7 which in the embodiment illustrated by way of example comprises two magnetic poles 8 and 9 of opposite polarity (North and South) arranged facing each other on opposite sides of the said length of circuit. These poles may be the poles of a permanent magnet.

Magnetic-field-generating arrangement 7 is provided in such a way as to generate a magnetic induction flux whose lines of force extend substantially along a direction at right angles to the flow direction of the solution in length 6 of hydraulic circuit 3. These lines of force are indicated by 10 in FIG. 1.

As an alternative to the embodiment illustrated diagrammatically, the magnetic-field-generating arrangement 7 may comprise one or more electromagnets, or a permanently magnetic coating directly applied to length 6 of hydraulic circuit 3.

When in operation, an induced electromotive force is generated within the flow of solution passing through length 6 of hydraulic circuit 3 with a velocity v as a result of passing through lines of force 10 of magnetic induction field B. The induced electric field intensity E is equal to $$E = vB$$

Under the effect of the induced electric field, an electric current flows in the solution passing through length 6 of hydraulic circuit 3 in a direction perpendicular to the direction of flow of the solution and the direction of the magnetic induction. This current is indicated diagrammatically by arrows 11 in FIG. 2.

In FIGS. 2, 12 and 1-3 indicate two electrodes placed in contact with the solution flowing in length 6 of hydraulic circuit 3. Electrodes 12 and 13 are positioned opposite each other in a direction essentially at right angles to the lines of force 10 of the magnetic field produced by magnetic poles 8 and 9 and the flow direction of the solution in that length of circuit 6.

With the electrical resistance between electrodes 12 and 13 indicated by R1, if an external user device 14 (FIG. 2) characterized by a resistance R2 is connected to those electrodes, the strength of the current I flowing towards the user is $$I = \frac{U}{R1 + R2}$$

where U=vBd, where d is the (average) distance between electrodes 12 and 13.

The electrical power transferred to user device 14 can then be expressed as follows:

$$W = I^2 \cdot R1 = \frac{U^2 \cdot R1}{(R1 + R2)^2}$$

The internal resistance R1 of generator 1 depends on the conductivity of the solution flowing in hydraulic circuit 3, and the geometry of the system.

In any event, if the magnetic field generated in length 6 of hydraulic circuit 3 is substantially uniform, the maximum transfer of power to user device 14 occurs when. R1 is equal to R2, and in this case the power transferred is $$W = \frac{\eta v^2 B^2 \Omega}{4}$$

where Ω is the volume of work of the solution circulating in hydraulic circuit 3, and η is the electrical conductivity of the said solution.

The last relationship shown above clearly indicates that, in order to increase the output power available, it is necessary to optimize the flow velocity of the solution in the hydraulic circuit and the conductivity of the circulating solution.

The colloidal solution used must be prepared in a way which is also optimal from the point of view of properties such as viscosity, for the purposes of fluid-dynamic yield.

Figure 2:
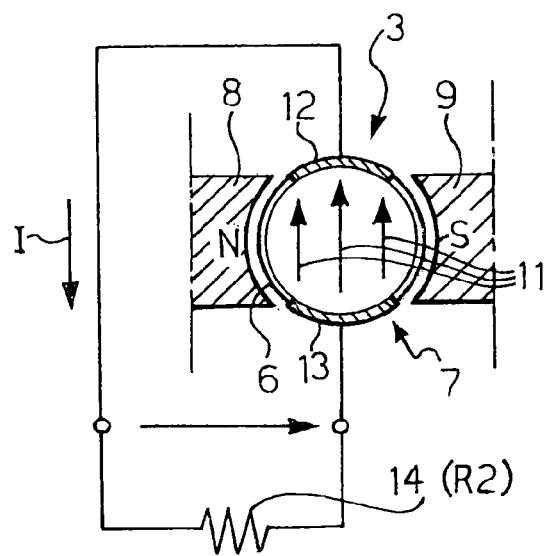
FIG. 2 is a view in partial cross section along the line II-II in FIG. 1.

FIG. 2 illustrates a variant embodiment of an electric generator according to the invention. In this figure, parts and components which are identical to or correspond to components already described are again attributed the same reference numbers as used previously.

Figure 3:
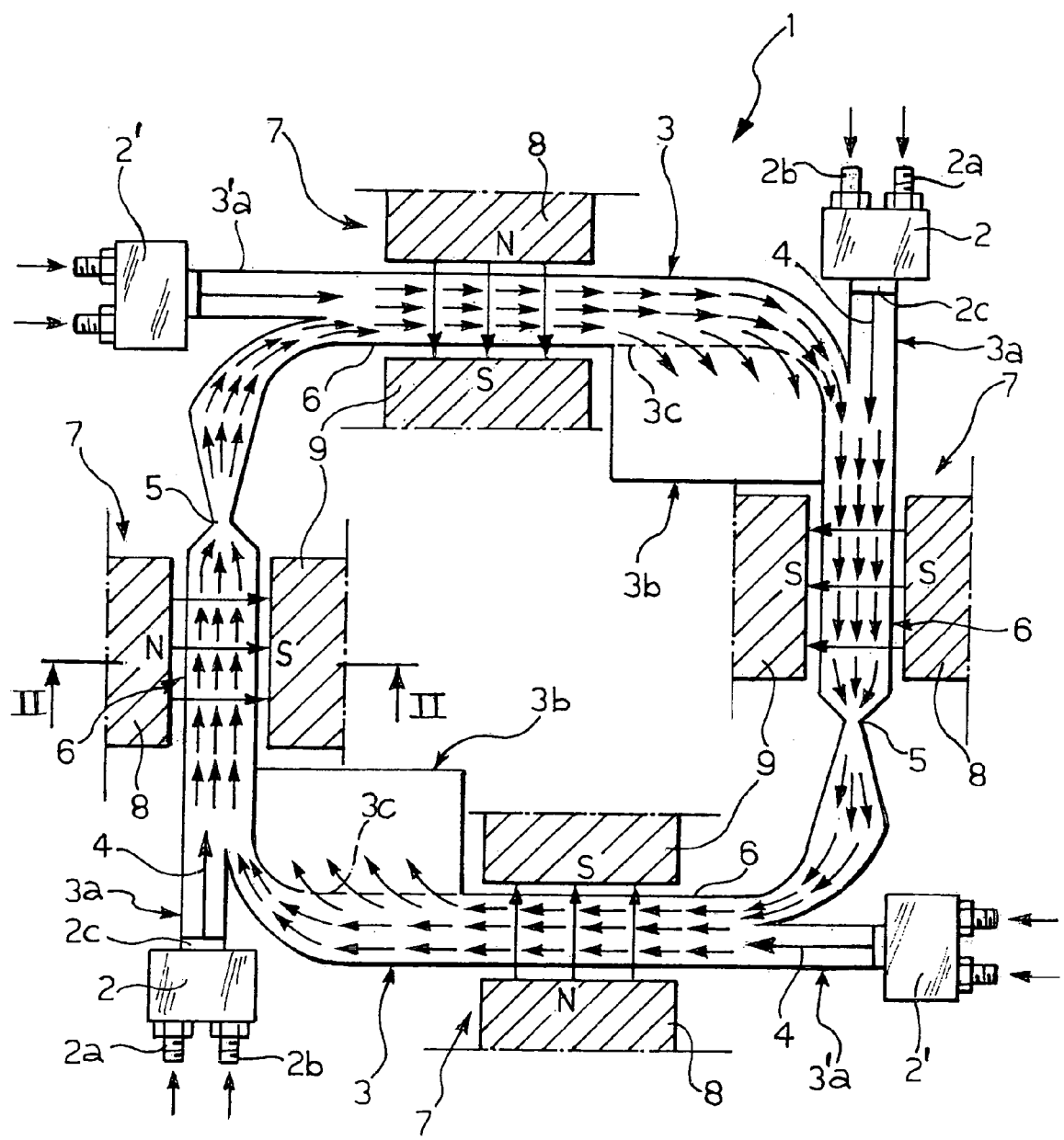
FIG. 3 is a diagrammatical illustration partly in cross section of another electric generator having a magnetohydrodynamic effect according to the invention.

In the embodiment according to FIG. 3, hydraulic circuit 3 has a plurality of inlet ports 3a which receive corresponding flows of pressurized gas from corresponding sources 2, such as microcombustors. Each of these inlet ports 3a is followed in the operating direction of the solution flow defined above by a corresponding restriction in cross section 5 and then a corresponding outlet port 3b. Between each restriction 5 and subsequent outlet port 3b, the hydraulic circuit has a corresponding supplementary inlet port 3'a, operatively connected to an associated pressurized gas source 2', such as a microcombustor.

In the generator according to FIG. 3, a corresponding magnetic-field-generating arrangement 7 is associated with each of the preferably straight lengths 6 of hydraulic circuit 3 lying between each inlet port 3a and the subsequent restriction in cross section 5, and between each supplementary inlet port 3'a and the subsequent outlet port 3b.

Through corresponding pairs of electrodes facing each other, each associated with a single length 6 of hydraulic circuit 3, it is possible when in operation to draw off an electric current which can be transferred to a user device. The pairs of electrodes associated with the various straight lengths of hydraulic circuit 3 may be interconnected with each other in various ways, for example in series or in parallel.

In the electric generator according to FIG. 3 the presence of supplementary inlet ports 3'a makes it possible to repressurise the fluid circulating in circuit 3 downstream from chokes 5 at which the fluid undergoes an expansion and condensation effect.

Of course, while the principle of the invention remains unchanged, embodiments and construction details may be widely varied from what has been described and illustrated purely by way of a non-restrictive example without thereby going beyond the scope of the invention as defined in the appended claims.

What is claimed is:

1. Electric generator comprising
   at least one source of pressurized gas,
   a closed hydraulic circuit, essentially in the form of a ring, containing a solution comprising an electrically-conducting vehicle liquid in which a charge of micro- or nanoparticles of a metal material is dispersed; the hydraulic circuit having at least one inlet port connected to said source so that, when in operation, it receives a flow of pressurized gas capable of causing circulation of said solution within the circuit in a predetermined direction, forming a two-phase gas-liquid mixture therewith, a restriction in the flow cross section, located downstream of said inlet port and calibrated so as to cause an increase in velocity and condensation of said two-phase mixture, and at least one outlet port located downstream from said restriction through which gas mixed with said solution can be released and evacuated from the circuit, magnetic-field-generating means associated with a length of the hydraulic circuit lying between the inlet port and the restriction in cross section capable of generating an induction flux substantially at right angles to the direction of flow of the solution in said length of circuit, and at least one pair of electrodes placed in contact with the solution in that length of the hydraulic circuit and facing each other in a direction essentially at right angles to the lines of force of the magnetic field produced by said generating means and the flow direction of the solution in said length of circuit, the arrangement being such that, when in operation, an electric current whose strength depends on the flow velocity of the solution in said length of the hydraulic circuit, the strength of the associated magnetic field and the electrical resistance between the aforesaid electrodes, flows between said electrodes.

2. Electric generator according to claim 1, in which said at least one source of pressurized gas comprises a microcombustion device.

3. Electric generator according to claim 1, in which the inlet port is constructed in such a way that a flow of gas can be delivered through it into the circuit in a direction substantially parallel to the local flow of solution.

4. Electric generator according to claim 1, in which said outlet port comprises a portion of porous wall of the hydraulic circuit capable of permitting gas to escape from the circuit.

5. Electric generator according to claim 4, in which said portion of porous wall is located on the inside of the circuit.

6. Electric generator according to claim 1, comprising a hydraulic circuit having a plurality of inlet ports designed to receive flows of pressurized gas respectively and each of which is followed in the operating direction of the solution flow by a corresponding restriction in cross section and then a corresponding outlet port, and in which the hydraulic circuit has a corresponding supplementary inlet port which can be operatively connected to a corresponding pressurized gas source between each restriction and the subsequent outlet port.

7. Electric generator according to claim 6, in which magnetic-field-generating means are associated with the lengths of hydraulic circuit lying between each inlet port and the subsequent restriction in cross section, and between each supplementary inlet port and the subsequent outlet port (3b).

8. Electric generator according to claim 1, in which the or each length of the hydraulic circuit with which magnetic-field-generating means are associated is substantially straight.

9. Electric generator according to claim 1, in which the vehicle liquid is water or an alcohol.

10. Electric generator according to claim 1, in which said metal material comprises micro- or nanoparticles of one or more noble metals or one or more alkali metals.

11. Electric generator according to claim 1, in which the metal material comprises micro- or nanoparticles of mercury.

12. Electric generator according to claim 1, in which said metal material comprises micro- or nanoparticles of alloys of tin and zinc.

* * * * *